UNITED STATES PATENT OFFICE.

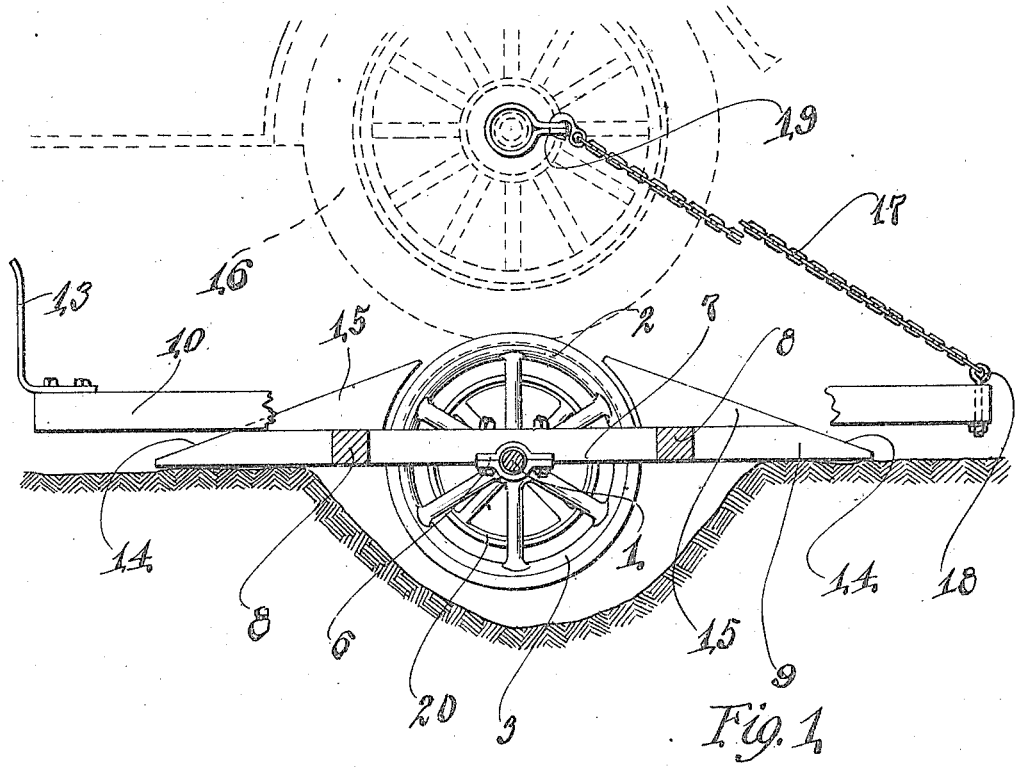
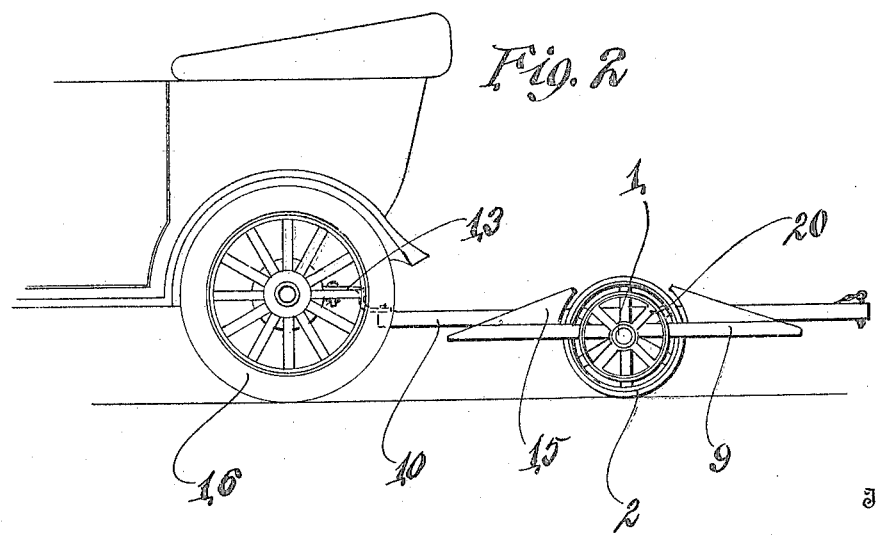

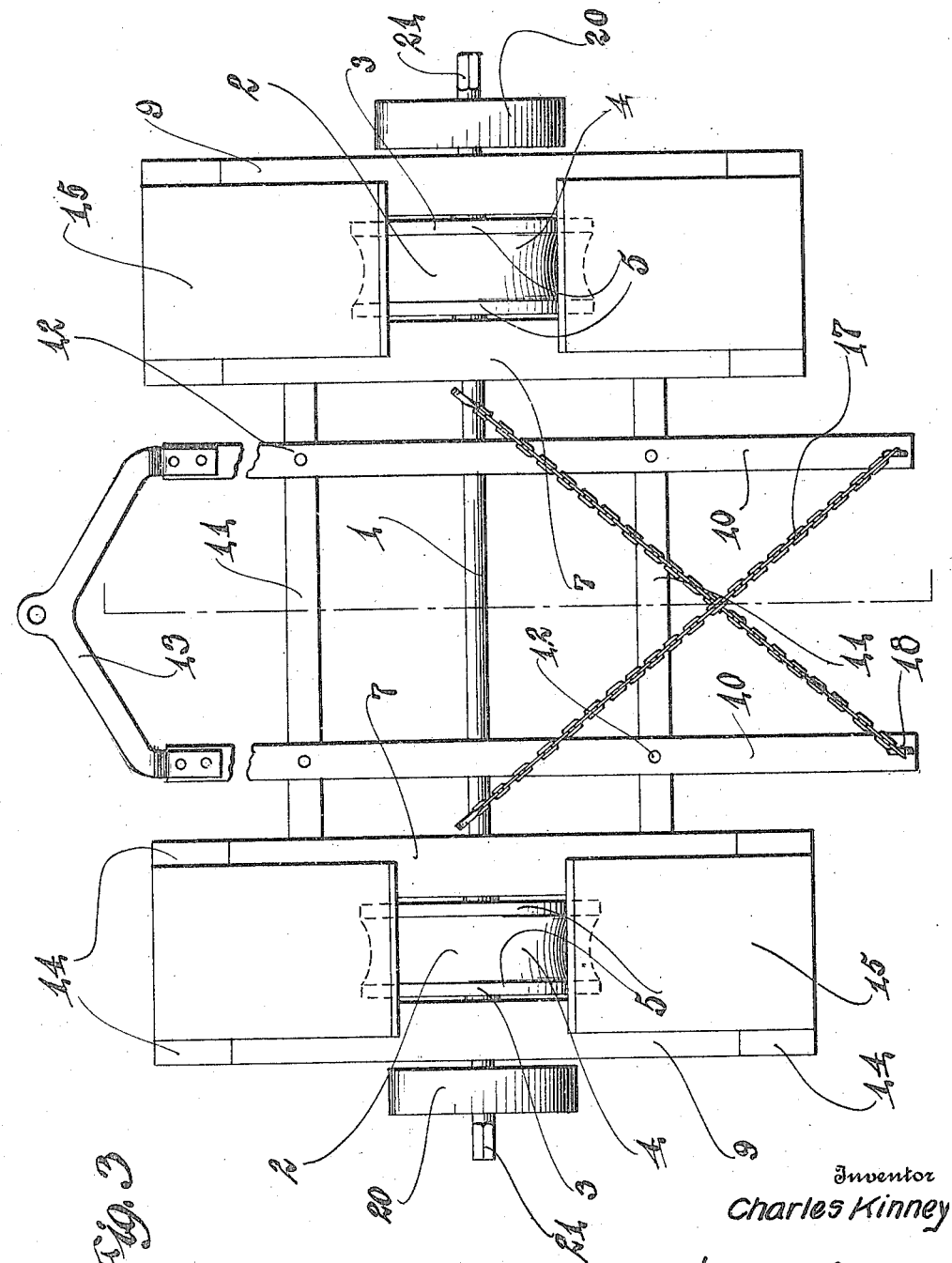

CHARLES KINNEY, OF SPOKANE, WASHINGTON, ASSIGNOR OF ONE-THIRD TO PHILLIP S. PALMER, OF SPOKANE, WASHINGTON.

POWER-TRANSMISSION DEVICE.

1,257,490.

Specification of Letters Patent.

Patented Feb. 26, 1918.

Application filed November 1, 1916. Serial No. 128,942.

*To all whom it may concern:*

Be it known that I, CHARLES KINNEY, a citizen of the United States, residing at Spokane, in the county of Spokane and State of Washington, have invented certain new and useful Improvements in Power-Transmission Devices, of which the following is a specification.

My invention relates to improvements in power transmission devices, and the principal object of my invention is the provision of a portable device of this character especially designed for the transmission of power from the driving wheels of motor vehicles.

A further object resides in providing a power transmission which will also serve as a trailer truck which may be utilized for carting or hauling purposes, and especially for transporting the machinery which it is adapted to drive, such, for instance, as wood saws, corn shellers, ensilage cutters, or, in fact, portable machinery of almost any description capable of operation by power generated by an automobile engine.

Broadly, my invention comprises a trailer truck having a power and axle shaft, a pair of combined road and power transmitting wheels carried thereby, horizontal supporting members mounted on the shaft, journals for the shaft in which it is designed to rotate, and convenient means for superimposing and maintaining the driving wheels of an automobile in frictional engagement with said power transmitting wheels.

The construction, operation, utility and advantages of my invention will be hereinafter fully described and explained, recourse being had to the accompanying drawings, in which—

Figure 1 is a side elevation of my device ready for use as a power means, and indicating in dash-lines the rear wheels of an automobile mounted thereon in operative position.

Fig. 2 is a side elevation showing the device connected up with the rear axle of the automobile for hauling, and Fig. 3 is a greatly enlarged top plan view of the complete apparatus.

Referring more specifically to the drawings in which like reference characters indicate like parts in the several views, the numeral 1 designates the combined axle and power shaft of my machine, having fixedly mounted thereon the companion power and road wheels 2 which are spaced apart to correspond with the breadth of tread of a motor vehicle. The rims or fellies 3 of these wheels are circumferentially grooved at 4 to fit and frictionally engage the tires of the automobile wheels 16, but are provided with the flat tread portions 5 in order that the wheels will serve as road wheels during hauling of the device from place to place.

Mounted upon said shaft 1 by means of suitable journal bearings 6 in which the shaft is designed to rotate, and disposed to encompass the wheels 2, are the rectangular companion supporting frames 7 composed of beams 8 and 9, the latter extending at right angles to the axle or shaft a sufficient distance to support the wheels for rotation when the apparatus is utilized as illustrated in Fig. 1, wherein a suitable excavation in the ground is provided.

The body frame portion of the device consists of transverse and longitudinal beams 10 and 11 secured rigidly together at their points of intersection 12 and by the metal brace and spanner 13 which latter provides means whereby the trailer may be attached to the rear axle of the motor vehicle for hauling.

The ends of the beams 9 are beveled or tapered off at 14 and the wedge-shaped blocks 15 permanently or detachably mounted thereon to provide inclines in order that the rear wheels of the auto may be readily superimposed upon the friction power wheels 2.

To maintain said wheels 16 in the desired superimposed frictional engagement with wheels 2 I provide the chains 17 secured to the beams 11 by means of the eye-bolts 18, the free ends of the chains being adapted for attachment to devices 19 mounted upon the hubs or axle of the motor car.

For transmitting power from the shaft 1 suitable belting pulleys 20 may be mounted thereon, or in case it is intended to employ a tumbling rod or continuous length of shafting, the ends of the shaft are squared, as at 21, to provide for fittings or connections.

From the foregoing description taken in connection with the drawings it is obvious that I have provided a very simple, inexpensive, efficient, and thoroughly practical power transmission possessing a wide range of utility, but which is especially adapted and suitable for the farm, where economical engine driven agricultural machinery is of such great importance and so extensively employed at the present day.

While I have illustrated and described a complete embodiment of my invention, it is to be understood that I reserve the right to make such changes in the general organization of the device and in the specific construction and form of the several elements, as will not depart from the spirit and scope of the invention as set forth in the appended claims, and without relinquishing my patent rights as therein defined.

Having described my invention, its construction and operation, I claim as new and desire to secure by Letters Patent of the United States:—

1. In combination with a superimposed motor vehicle, a combined truck trailer and power transmission device, comprising a rotatable power and axle shaft, circumferentially grooved friction driven wheels fixedly mounted on the shaft, supporting beams and journals for the shaft, a body frame mounted on the shaft, inclines mounted on the supporting beams, and retaining cables adapted to be secured to the frame and to the superimposed vehicle, to connect said vehicle and frame to maintain the drive wheels of the vehicle in frictional engagement with the driven wheels of the transmission device.

2. A device of the character described, consisting of a rotatable power shaft, circumferentially grooved wheels spaced and mounted on said shaft and adapted for use in transporting the device, pairs of horizontally extending supporting beams mounted on said shaft and closely encompassing said wheels and being adapted to freely support said wheels when the wheels are placed over a hole in the ground, inclines mounted on said pairs of supporting beams, and means for maintaining friction driving wheels upon said grooved wheels in superimposed relation.

3. A device of the character described, consisting of a rotatable power shaft, circumferentially grooved friction driven and road engaging wheels spaced apart and mounted on said shaft, horizontally extending wheel supporting beams mounted on said shaft and encompassing said wheels, a vehicle body frame disposed intermediate of and connecting said supporting frames, a hauling means carried by the body portion, and means for maintaining friction driving wheels upon said driven wheels in superimposed relation.

In testimony whereof, I hereby affix my signature.

CHARLES KINNEY.

Copies of this patent may be obtained for five cents each, by addressing the "Commissioner of Patents, Washington, D. C."